United States Patent
Ogura et al.

(10) Patent No.: US 6,330,511 B2
(45) Date of Patent: Dec. 11, 2001

(54) DANGER DECIDING APPARATUS FOR MOTOR VEHICLE AND ENVIRONMENT MONITORING APPARATUS THEREFOR

(75) Inventors: Hiroyuki Ogura; Naoto Ishikawa, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/785,426

(22) Filed: Feb. 20, 2001

(30) Foreign Application Priority Data

Feb. 22, 2000 (JP) .................................................. 12-044026

(51) Int. Cl.$^7$ ....................................................... G01S 13/93
(52) U.S. Cl. ............................................. 701/301; 340/435
(58) Field of Search ..................................... 701/300, 301, 701/96, 78; 340/435, 903; 342/70

(56) References Cited

U.S. PATENT DOCUMENTS

| | | | |
|---|---|---|---|
| 6,025,797 | * | 2/2000 | Kawai et al. ........................ 342/700 |
| 6,115,651 | * | 9/2000 | Cruz ..................................... 340/435 |
| 6,135,755 | * | 12/2000 | Peer et al. ............................ 701/301 |
| 6,185,499 | * | 2/2001 | Kinoshita et al. ..................... 701/96 |
| 6,226,592 | * | 5/2001 | Luchscheiter et al. .............. 701/301 |
| 6,246,961 | * | 6/2001 | Sasaki et al. ........................ 701/301 |
| 6,269,308 | * | 7/2001 | Kodaka et al. ...................... 701/301 |

* cited by examiner

Primary Examiner—Richard M. Camby
(74) Attorney, Agent, or Firm—Armstrong, Westerman, Hattori, McLeland and Naughton, LLP (57) ABSTRACT

In a danger deciding means for a vehicle, information which changes according to the road structure around a vehicle concerned is acquired. When a plurality of images obtained by picking up different monitoring regions are received, on the basis of the acquired information, the image of the region which must be monitored is selected from the plurality of images. The selected image is processed to detect the approaching degree of an approaching object. On basis of the approaching degree, danger of contact or collision with the approaching object is decided.

7 Claims, 6 Drawing Sheets

DANGER DECIDING APPARATUS FOR MOTOR VEHICLE AND ENVIRONMENT MONITORING APPARATUS THEREFOR

BACKGROUND OF THE INVENTION

1. Field of the Invention

This invention relates to a danger deciding apparatus for a motor vehicle and an environment monitoring apparatus for a motor vehicle. More specifically, this invention relates to a danger deciding apparatus for a motor vehicle for detecting the approaching degree of an approaching object in a picked-up image of an environment of the vehicle to decide the danger of contact or collision (hereinafter simply referred to contact) with the approaching object, and an environment monitoring apparatus for monitoring the environment of the vehicle to decide the danger of contact with the approaching object.

2. Description of the Related Art

For example, when a driver of a vehicle running on a road of one-side two or more lanes of e.g. a speed way intends to change his running lane, if he changes the lane while he is missing a vehicle which catches up with his own vehicle on another lane at a higher speed than his own vehicle from the rear-side direction, there is strong possibility of a serious accident.

When the following vehicle on the same lane abruptly approaches his own vehicle from the rear-side direction, if the driver makes abrupt braking, there is possibility of bumping-into-the back. Therefore, it is desired that the driver surely notices or recognizes other vehicles in the environment.

A technique for avoiding the danger as described above has been proposed as an environment monitoring system for a vehicle in JP-A-7-50769. Now referring to FIGS. 8A–8D, an explanation will be given of this environment monitoring system.

Figure 8A:
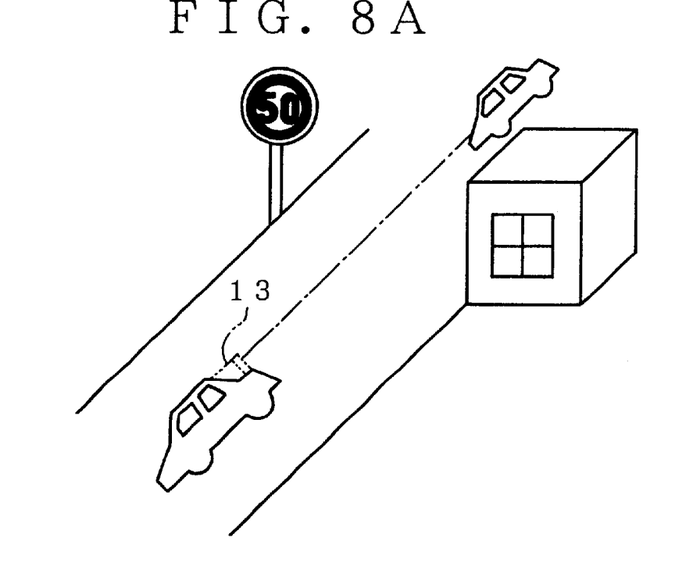
FIGS. 8A to 8D are views for explaining a change in the road image in a rear-side direction acquired by a camera.
Figure 8B:
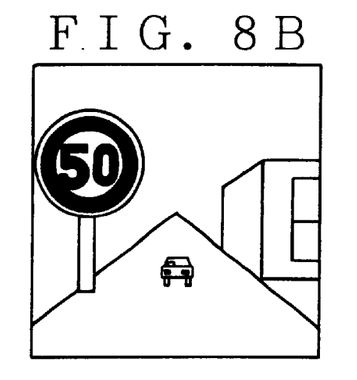
Figure 8C:
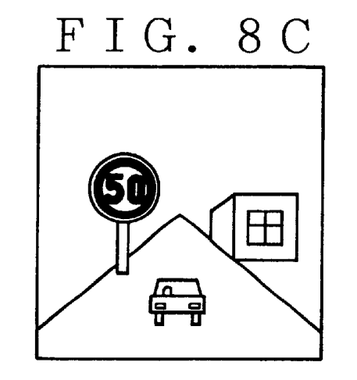

FIGS. 8A–8C are views for explaining a change in a rear/rear-side direction (hereinafter referred to as rear-side direction) image acquired by a video camera 1. FIG. 8A shows a status inclusive of the vehicle concerned. FIG. 8B shows an image acquired by a video camera 13 at timing t in an environment of the vehicle concerned. FIG. 8C shows an image acquired at timing t+Δt.

Figure 8D:
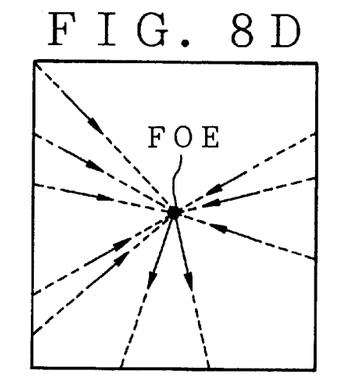

Now it is assumed that the vehicle concerned is running straight on a flat road. The road sign and building residing in the rear of the vehicle concerned in FIG. 8A are observed as images shown in FIGS. 8B and 8C at timings t and t+Δt, respectively. Coupling the corresponding points in these two images provides speed vectors as shown in FIG. 8D. There are referred to as "optical flows".

It can be seen that the optical flows radially appear from an FOE (Focus of Expansion) where the road disappears. While the vehicle concerned runs, the optical flows of an object which leaves from the vehicle concerned are vectors in a direction converging toward the FOE. The optical flows on the object which approaches toward the object concerned are vectors in a direction diverging from the FOE.

Therefore, a conventional environment monitoring system detects the optical flows by processing the rear-side direction image acquired by a camera 13, and uses to monitor the relationship between the vehicle concerned and the following vehicle or another vehicle running on an adjacent lane to detect the other vehicle approaching the vehicle concerned, thereby deciding danger of the contact of the vehicle concerned with the approaching object.

In some prior arts, a technique of searching corresponding points using two cameras is adopted. Specifically, an edge point Pa (not shown) of an object is detected in a rear-side direction image acquired by the one camera. A point Pb (not shown) of the image acquired by another camera corresponding to the detected edge point Pa is detected. The position P of the object is acquired by the pixel coordinates of Pa and Pb. On the basis of the position P of the approaching object acquired, the existence of the approaching object such as another vehicle approaching the vehicle concerned is detected and danger of contact of the approaching object is decided.

As an alternative technique, cameras are installed to be oriented toward both left-side and right-side directions in the front or rear portion of the vehicle, and the images in both left-side and right-side directions acquired by the cameras are processed in the manner similar to the above rear-side direction image. When the vehicle concerned approaches a side road intersecting the vehicle concerned such an approaching an intersection or outgoing from the garage facing a road, the existence of the approaching object such as a man or another vehicle approaching from the side road is detected and danger of collision of the vehicle concerned with the approaching object is decided.

In the environment monitoring apparatus for a vehicle, in order to recognize an approaching object in the environment, the camera(s) may be located at various points other than the points where the rear-side direction image or side direction images can be acquired.

However, the above prior art environment monitoring apparatus individually makes image processing according to the installed position of the camera to detect the approaching object. Specifically, where both of rear-side monitoring and side monitoring are intended simultaneously, two CPUs therefor are prepared separately. The one is intended for processing the rear-side direction image to detect the approaching object from the rear-side direction. The other is intended for processing the side direction image to detect the approaching object from the side direction. Where extension of the monitoring range is intended by provision of cameras in various directions, plural CPUs for image processing must be prepared. This is problematic from the standpoint of cost.

In order to solve the above problem, it can be proposed to make image processing for plural images sequentially using a single CPU. However, this lengthens the time required for image processing, thereby deteriorating the accuracy of detecting the approaching object. Thus, it is not possible to detect danger of contact with an environmental approaching object.

SUMMARY OF THE INVENTION

A first object of this invention is to provide a danger deciding apparatus for a motor vehicle which can decide danger of contact with an environmental approaching object inexpensively and accurately by selecting an image of the region which must be monitored from a plurality of images in view of a road structure and processing the selected image to detect the approaching object.

A second object of this invention is to provide an environment monitoring apparatus for a motor vehicle which can monitor the environment accurately and inexpensively.

Figure 1:
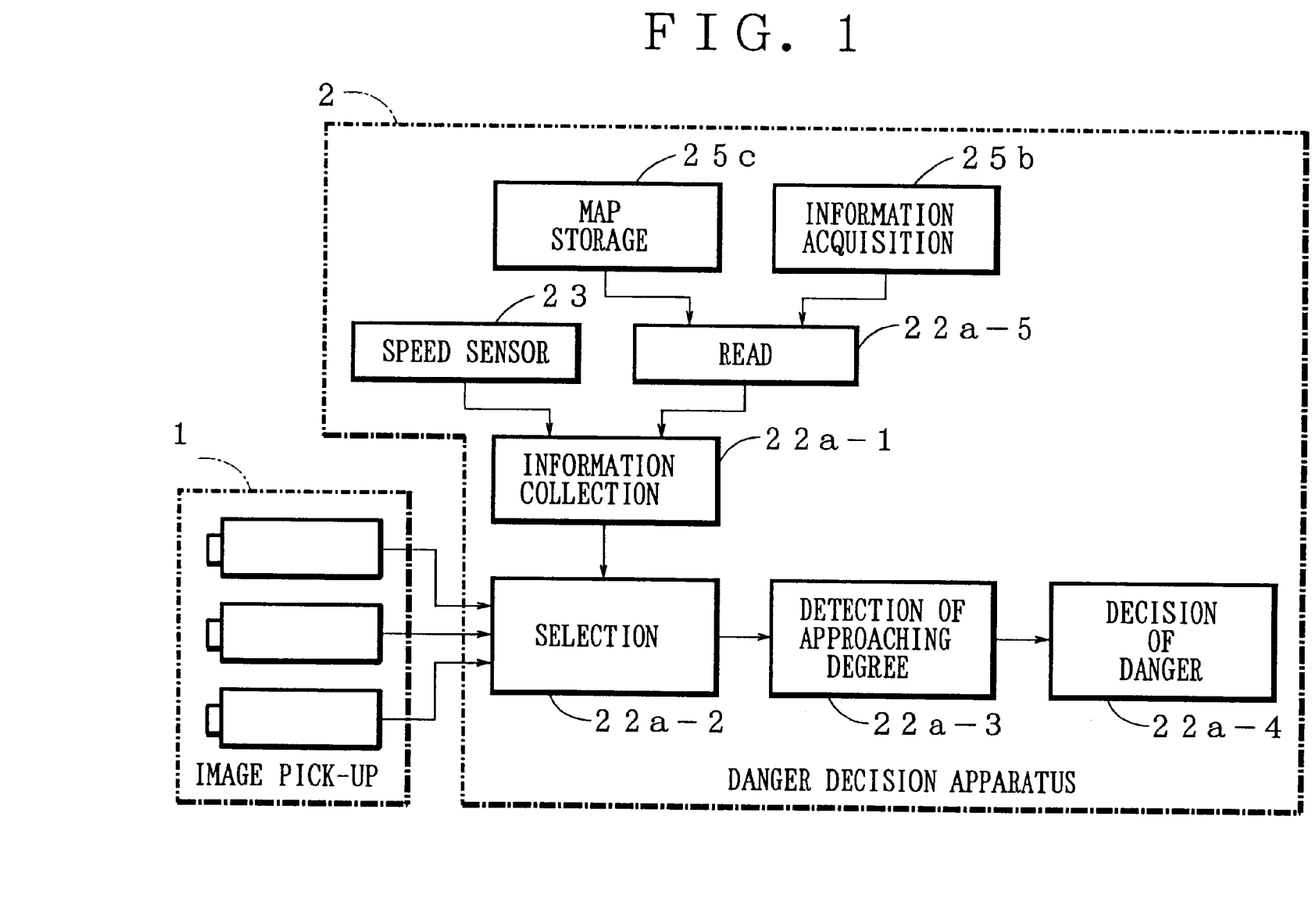
FIG. 1 is a block diagram showing the basic configuration of a danger deciding apparatus for a motor vehicle and an environment monitoring apparatus for a motor vehicle according to this invention.

In order to attain the first object, in accordance with this invention, as shown in FIG. 1, there is provided a danger deciding apparatus for a vehicle comprising:

information collecting means 22a-1 for collecting information which changes according to a road structure around a vehicle concerned;

selecting means 22a-2 for selecting an image of the region which must be monitored from a plurality of images on the basis of the collected information when they are received, the plurality of images being obtained by picking up different monitoring regions;

detecting means 22a-3 for processing the selected image to detect the approaching degree of an approaching object; and deciding means 22a-4 for deciding danger of contact with the approaching object on basis of the approaching degree.

In this configuration, noting that a region which must be monitored should be determined according to the road structure around the vehicle concerned, the image selected from a plurality of images on the basis of the information which changes according to the road structure is processed. In this case, the approaching degree detecting means 22a-3, which is adapted to process a plurality of images, processes only the image of the region which must be monitored so that the accuracy of detecting the approaching object is not deteriorated.

Preferably, the plurality of images include a rear-side direction image obtained when a rear region is picked up and left/right-side direction images obtained when left/right-direction regions are obtained. For example, where the road structure has an intersection difficult to see ahead of the vehicle concerned, the left/right-side direction region must be monitored. Where the road structure is a speedway, the rear-side direction region must be monitored. Noting this, the image selected from the rear-side direction image and left/right direction images on the basis of the information which changes according to the road structure is processed. In this way, the approaching degree detecting means 22a-3, which is adapted to process a rear-side direction image and left/right-side direction images, processes only the image of the region which must be monitored so that the accuracy of detecting the approaching object is not deteriorated.

Preferably, the danger deciding apparatus for a vehicle comprises a speed sensor 23 for detecting a speed of a vehicle concerned and the information collecting means collects the speed as the above information. In this configuration, the information collecting means 22a-1 can divert the speed of the vehicle concerned from the speed sensor as required information.

Preferably, the plurality of images include an image which is received only when the road structure around the vehicle concerned becomes a prescribed structure, and the information collecting means collects the received image as the required information. In this configuration, the information collecting means can divert such an image as required information.

Preferably, the danger deciding apparatus for a vehicle further comprises map storage means 25c for storing map information having road information including the road structure; information acquiring means 25b for acquiring information indicative of the present position of the vehicle concerned; and reading means 22a-5 for reading the road information around the present position of the vehicle concerned from the map storage means on the basis of the information acquired by the information acquiring means. The information collecting means collects the road information read by the reading means as the information. In this configuration, the information collecting means 22a-1 collects the road information including the road structure around the present position read from the map storage means 25c by the reading means 22a-5. Therefore, the map storage means 25c and information acquiring means 25b of the car navigation system installed in the vehicle concerned can be used to collect the necessary information. In addition, the road information including the road structure can be collected as the required information.

Preferably, the selecting means always selects the images of the regions which must be monitored simultaneously or a single image when it is received. In this configuration, the left/right-side direction images which must be processed simultaneously or the single image which is not selected according the road structure can be processed all the time.

In order to attain the second object, in accordance with this invention, there is provided an environment monitoring apparatus for a vehicle comprising:

information collecting means for acquiring information which changes according to a road structure around a vehicle concerned;

pick-up means for picking up different monitoring regions to acquire a plurality of images;

selecting means for selecting an image of the region which must be monitored from a plurality of images on the basis of the collected information when they are received, detecting means for processing the selected image to detect the approaching degree of an approaching object; and deciding means for deciding danger of contact with the approaching object on basis of the approaching degree.

In this configuration, noting that a region which must be monitored should be determined according to the road structure around the vehicle concerned, the image selected from a plurality of images on the basis of the information which changes according to the road structure is processed. In this case, the approaching degree detecting means 22a-3, which is adapted to process a plurality of images, processes only the image of the region which must be monitored so that the accuracy of detecting the approaching object is not deteriorated.

The above and other objects and features of this invention will be more apparent from the following description taken in conjunction with the accompanying drawings.

DESCRIPTION OF THE PREFERRED EMBODIMENTS

Embodiment 1

An explanation will be given of the first embodiment of this invention.

Figure 2:
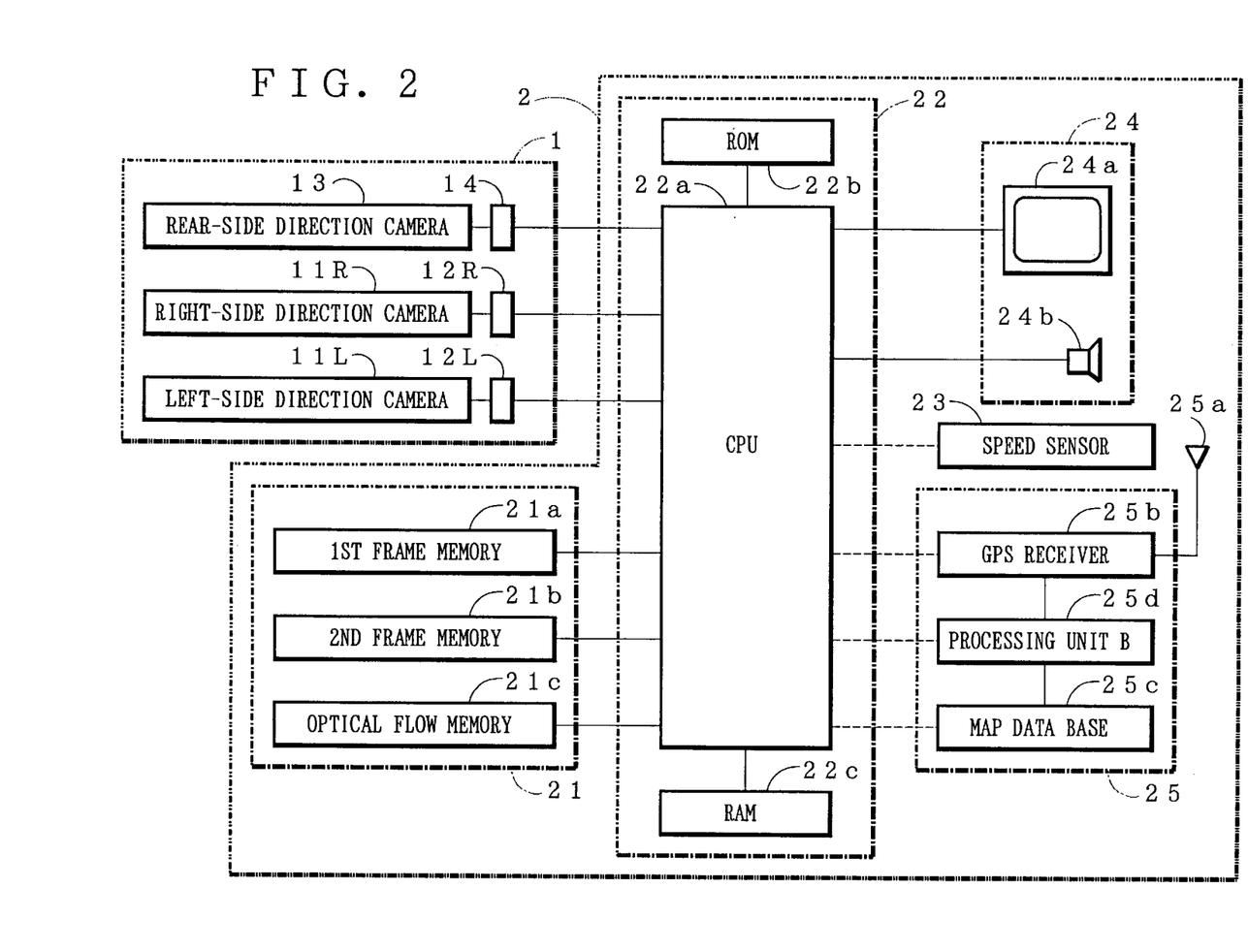
FIG. 2 is a block diagram showing a first embodiment of an environment monitoring apparatus equipped with the danger deciding apparatus according to this invention.

FIG. 2 is an environment monitoring apparatus for a motor vehicle equipped with a danger deciding apparatus for a motor vehicle according this invention. As seen from FIG. 1, the environment monitoring apparatus includes an image pick-up section 1 picking up different monitoring regions to acquire a plurality of images; and a danger deciding apparatus for a motor vehicle for detecting the approaching degree of an approaching object such as an approaching vehicle residing within a monitoring region picked up by the image pick-up section 1.

Figure 3A:
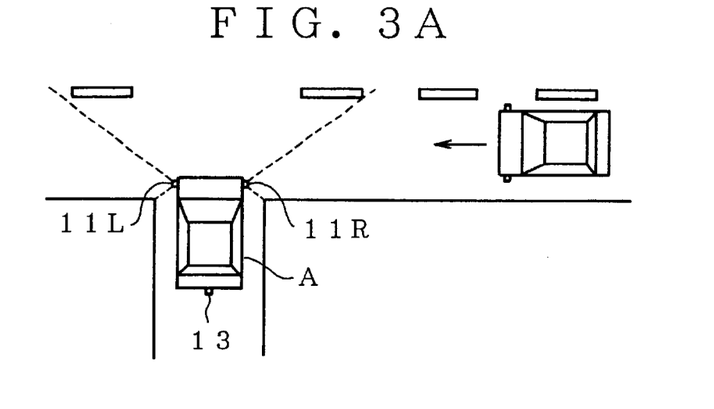
FIGS. 3A and 3B are views for explaining the positions where a rear-side direction camera, a right-side direction camera and a left-side direction camera are attached.

As shown in FIGS. 2 and 3, at the front of a vehicle for example, the image pick-up means 1 includes a right-side direction camera 11R which is attached to the right-side position of the front and picks up the right-side direction region of the vehicle to acquire a right-side direction image, a right image plane 12R on which the right-side direction image is imaged, a left-side direction camera 11L which is attached to the left-side position of the front and picks up the left-side direction region of the vehicle to acquire a left-side direction image, and a left image plane 12R on which the left-side direction image is imaged. Therefore, as shown in FIG. 3A, when the vehicle concerned is located at a position A before the approaching position of an intersection, the left- and right-side direction cameras 11R and 11L can monitor the side direction road which intersects the lane concerned on which the vehicle concerned runs.

Figure 3B:
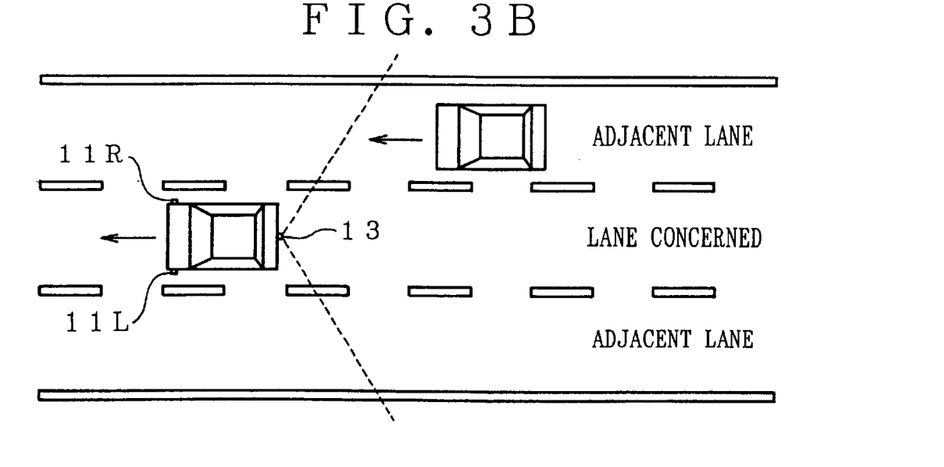

The image pick-up means 1 further includes a rear-side direction camera 14 which is attached to the top or rear of a rear trunk of the vehicle toward the rear of the vehicle and picks up the rear-side direction region to acquire a rear direction image and a rear image plane 14 on which the rear-side direction image is imaged. Therefore, as seen from FIG. 3B, the rear-side direction camera 13 can monitor the lane concerned behind the vehicle concerned and lanes adjacent to the vehicle concerned.

The danger deciding apparatus for a vehicle includes a storage unit 21 for storing the image acquired from the image pick-up unit 1, a microcomputer A22 (hereinafter referred to as "$\mu$COM A22") which performs the processing based on the image acquired by the image pick-up unit 1 and processing of deciding danger of contact with another vehicle, a speed sensor 23 for detecting the speed of the vehicle concerned to supply speed information to the $\mu$COM A22, and a warning unit 24 which gives a warning when it is decided by the $\mu$COM A22 that there is danger of contact with another vehicle.

The storage unit 21 includes a first frame memory 21a, a second frame memory 21b and an optical flow memory 21c. The first and the second frame memories 21a and 21b temporarily store pixel data with m rows and n columns of e.g. 512×512 pixels and luminance of 0–255 levels which have been converted from the image acquired by the image pick-up unit 1 and supplies them to the $\mu$COM A22.

These first and second frame memories 21a and 21b successively store the images in such a fashion that the images are stored in the first frame memory 21a at timing t, in the second frame memory 21b at timing t+$\Delta$t, again in the first frame memory 21a at timing t+2$\Delta$t . . .

The optical flow which is a movement quantity of an approaching object between two images acquired apart by a prescribed time $\Delta$t from each other is temporarily stored in the optical flow memory 21c.

The $\mu$COM 22 includes a CPU 22a for perfuming various computations according to a prescribed control program, a ROM 22b for storing the control program and prescribed values and a RAM 22c for temporarily storing data necessary for performing the computation.

The CPU 22a performs processing of collecting information which changes according to the road structure around a vehicle concerned (as information collecting means); processing of selecting, on the basis of the collected information, an image acquired by picking up a region which must be monitored from the plurality of images when a rear-side direction image, left-side and right-side direction images are received (as selecting means); processing of detecting, as an optical flow, a movement quantity of an approaching object in the selected images apart by a prescribed time from each other (as means for detecting an approaching degree); and processing of deciding danger of contact with an approaching vehicle on the magnitude or position of the optical flow (as danger deciding means).

A speed sensor 23 has a running sensor (not shown) which generates a pulse signal whenever the vehicle runs by a unit distance and others and detects the speed information on the pulse signal from the running sensor. The speed information changes according to the road structure around the vehicle concerned. This is because the vehicle speed falls e.g. when there is an intersection difficult to see ahead of the vehicle concerned, a stopping line ahead of the vehicle, or the width of the lane concerned is narrow, and rises e.g. when the lane concerned is a speedway.

The warning unit 24 includes a display 24a and a speaker 24b. The display 24a informs the driver of danger in such a manner that the image acquired by the image pick-up unit 1 is displayed, or message is displayed when the CPU 22a within the $\mu$COM A22 decides that there is danger of contact with another vehicle. The speaker 24b informs the driver of danger by audio guidance or warning sound.

Figure 4:
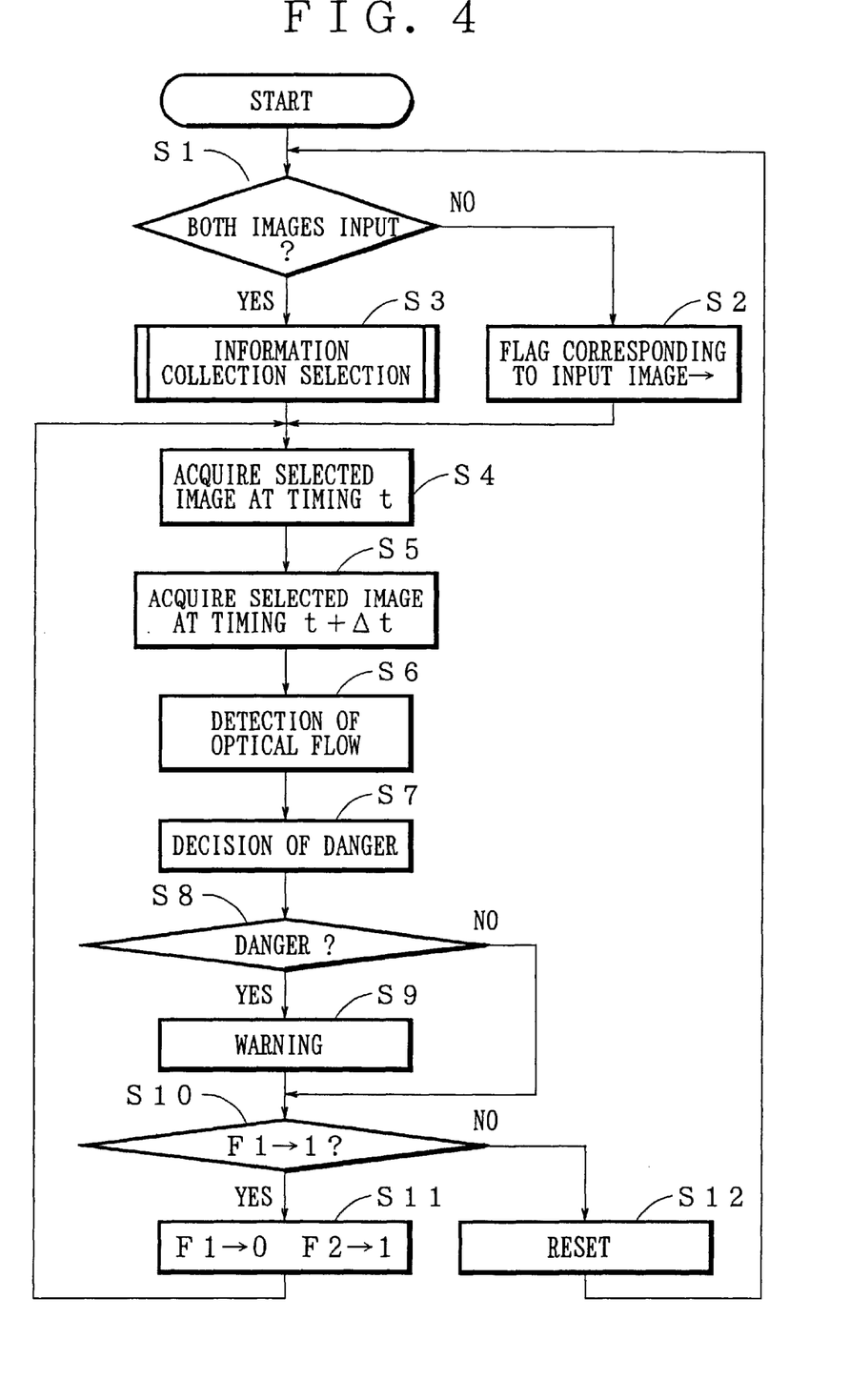
FIG. 4 is a flowchart for explaining the processing procedure of a CPU shown in FIG. 1.

FIG. 4 is a flowchart showing the procedure of processing performed by the CPU 22a. Now referring to the flowchart of FIG. 4, an explanation will be given of the operation of the environment monitoring apparatus for a vehicle.

First, in response to "ON" of an ignition switch, the CPU 22a proceeds to an initial step (not shown) where the left-side direction flag F1, right-side direction flag F2 and rear-side direction flag F3 are reset to 0, and thereafter proceeds. to a next step S1.

In step S1, the CPU 22a decides whether or not both the rear-side direction image and left/right-side direction image have been received. If only one of the rear-side direction image and the left/right-side direction image has been received ("NO" in step S1), the CPU 22a sets the flag corresponding to the received image at '1' (step S2) and proceeds to step S4. Namely, if only the left/right-side direction images are received, the CPU 22a sets the flag F1 for selecting the left-side direction image at '1', and if only the rear-side direction image is received, the CPU 22a sets the flag F3 for selecting the rear-side direction image at '1'.

In these steps S1 and S2, when only the rear-side direction image is received, i.e. only one image is received, or only the left/right-side image is received, i.e. although two or more images are received, only the images acquired when the regions which must be monitored simultaneously are picked up, the input image (s) can be monitored all the time irrespectively of the road structure.

On the other hand, if both images are received ("YES" in step S1), the CPU 22a performs the processing of collecting information which changes according to the road structure around the vehicle concerned and selecting one of the rear-side direction image and the left/right-side direction image on the basis of the collected information (step S3). Referring to the flowchart of FIG. 5, an explanation will be given of the details of the processing of information collection and selection. First, CPU 22a collects speed information from the speed sensor 23 (step S301), and decides whether or not the speed of the vehicle concerned is not higher than e.g. 3 Km/h (step S302).

Figure 5:
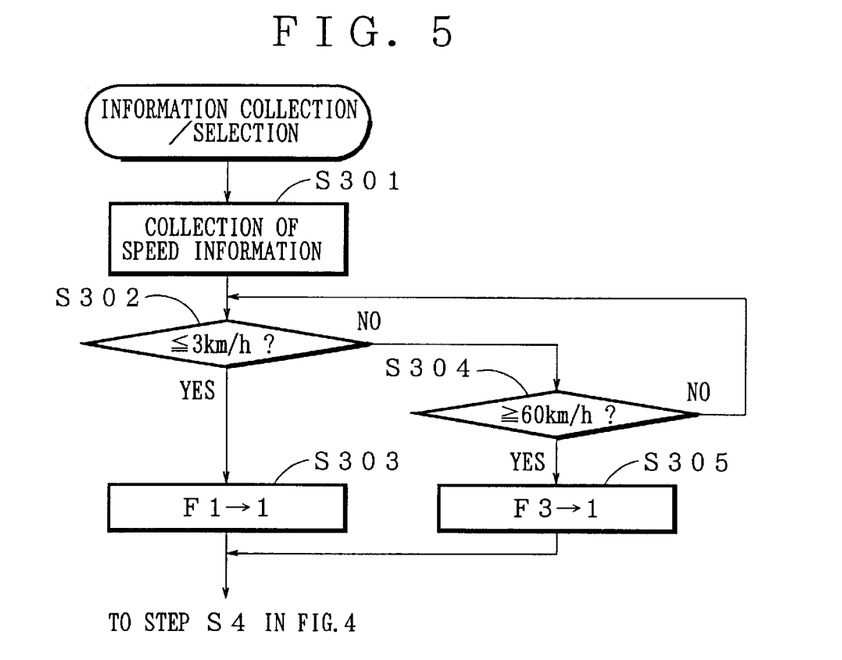
FIG. 5 is a flowchart for explaining collection/selection of information according to the first embodiment.

If the vehicle speed is not higher than 3 km/h ("YES" in step S302), CPU 22a decides that the road structure has an intersection difficult to see ahead of the vehicle concerned, a stopping line ahead of the vehicle, and/or narrow lane concerned. Where the environment around the vehicle concerned has such a road structure, it is necessary to detect an approaching object such as another vehicle which approaches from a side road intersecting the lane concerned. Therefore, CPU 22a sets the left-side direction flag F1 at '1' to select the left-side direction image (step S303) and proceeds to step S4.

On the other hand, if the vehicle speed is not lower than 60 km/h ("NO" in step S302 and "YES" in step S304), CPU 22a decides that the road structure is a speedway or road of high priority. Where the environment around the vehicle concerned has such a road structure, it is necessary to detect an approaching object such as another vehicle which approaches from the rear of the vehicle concerned. Therefore, CPU 22a sets the rear-side direction flag F3 at '1' to select the rear-side direction image (step S305) and proceeds to step S4. If the vehicle speed is not higher than 3 km/h nor lower than 60 km/h, CPU 22a decides that the road structure around the vehicle concerned does not include the left/right-side direction monitoring and rear-side direction monitoring regions, and returns to step S11.

In step S4 in FIG. 4, CPU 22a takes in the image (hereinafter referred to as "selected image") corresponding to the flag with '1' among the left-side direction flag F1, right-side direction flag F2 and rear-side direction flag F3, and stores it in the first frame memory 21a (step S5). After a prescribed time Δt, CPU 22a takes in the selected image and stores it in the second frame memory 21b.

CPU 22a performs the processing of detecting an optical flow indicative of the movement quantity of the approaching object in the selected images apart by the prescribed time, and stores the detected optical flow in the optical flow memory 21c (step S6).

An explanation will be given of the details of the processing of detecting an optical flow.

As described in connection with the prior art, the approaching object moves in a diverging direction of the optical flow from the point where the road and others vanishes from the selected image, i.e. FOE. Noting this fact, referring to FIGS. 6A and 6B, the procedure of detecting the optical flow will be explained.

Figure 6A:
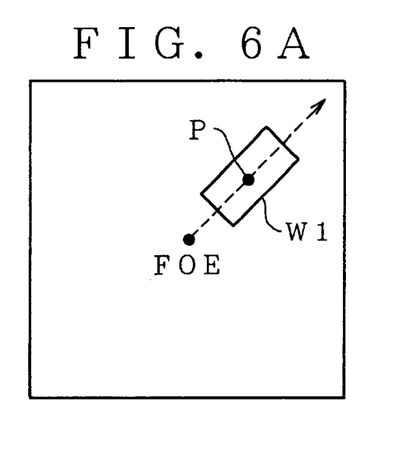
FIGS. 6A and 6B are views for explaining the processing of detection of an optical flow in FIG. 4.
Figure 6B:
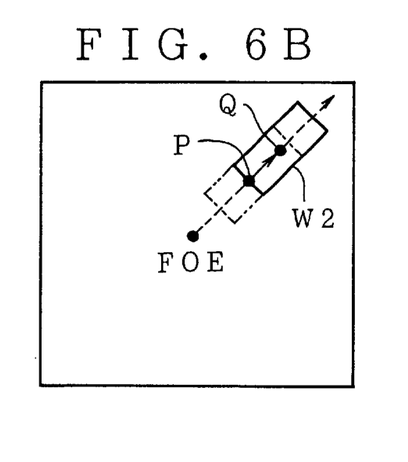

First, on the selected image picked up at timing t, a slender window W1 is set around a certain characteristic point P in a radial direction of the FOE set as described above (i.e. in the direction of connecting the FOE 1 to the characteristic point P) (FIG. 6A). Subsequently, on the selected image at timing t+tΔ acquired from the second frame memory 21b, while a window W2 corresponding to the window W1 is shifted one point by one point in the radial direction from the FOE, its correlated value with the window W1 (FIG. 6B). The point Q of the window W2 where the correlated value is the maximum is taken as the point corresponding to the point P, i.e. the point on the same object. The movement PQ is detected as the optical flow which represents the movement quantity of the approaching object. The detected optical flow is stored in the optical flow memory 21c.

Incidentally, the characteristic point may be a pixel having a prescribed luminance difference from that of its adjacent pixel. The FOE may be a crossing point of the extended lines of the white lines located on both sides of the road picked up on the selected image.

CPU 22a performs the processing of deciding danger of the contact with another vehicle on the basis of the size of the optical flow stored in the optical flow memory 21c (Step S7).

If it is decided that there is danger of contact ("YES" in step S8), in order to inform the driver of this fact, CPU 22a performs the processing of warning of issuing a warning sound signal and/or a warning image signal to the warning unit 24 (step S9), and proceeds to step S10. In response to the warning signal, a warning indication "there is an approaching vehicle" is displayed on the display 24a, or a warning guidance "there is an approaching vehicle" is issued by sound from e.g. the speaker 5a.

On the other hand, if it is decided in the processing of danger deciding that there is no danger of contact with another vehicle ("NO" in step S8), CPU 22a directly proceeds to step S10. In step S10, it is decided whether or not the left-side direction flag F1 is 1. If the left-side direction flag F1 has been set at 1 in the processing of step S2 or S3 ("YES" in step S10), in order to monitor the right-side direction region, CPU 22a sets the left-side direction flag F1 at 0 and the right-side direction flag F2 at 1, and returns to step S2 (step S11). In step S11, after the processing has been made on the left-side direction image, the processing will be automatically made on the right-side direction image.

On the other hand, if the rear-side direction flag F3 is 1 or the right-direction flag F2 is 1 after completion of the left/right monitoring by the processing of step S2 or step S3 ("NO" in step S10), CPU 22a resets the left/right-side direction flags F1, F2 and rear-side direction flag F3 (step S12) and returns to step S1.

As described above, the processing is made on the image selected from the rear-side direction image and the left/right-side direction image on the basis of the speed information which changes according to the road structure. Therefore, where CPU 22a is adpted to process both the rear-side direction image and the left/right-side direction images, the processing is made on only the image acquired by picking up the region which must be monitored. Thus, it is possible to decide the danger of contact with an approaching object in the environment of the vehicle concerned inexpensively and accurately without deteriorating the detecting accuracy of the object.

Since the speed information from the speed sensor 23 mounted on the vehicle is used as the information which changes according to the road structure, there is no need of providing additional means for producing necessary information. This contributes to cost reduction of the monitoring apparatus.

Embodiment 2

In the first embodiment, the speed information of the vehicle was collected as the information which changes according to the road structure. Meanwhile, in a main conventional monitoring apparatus, the side-direction monitoring has been made while the driver is seeing the left/right-side direction image displayed on the display 24a.

In some monitoring apparatus, when the vehicle speed becomes 3 Km/h or lower, on the basis of the decision that the road structure around the vehicle concerned has a prescribed structure e. g. there is an intersection difficult to see ahead of the vehicle concerned, the left/right-side direction image pick-up cameras 11 are automatically tuned on to acquire the left/right-side direction images and display them on the display 24a. Therefore, for the purpose of image selection, the acquired information on the left/right-side direction image from the monitoring apparatus can be used as the information which changes according to the road structure in the environment of the vehicle concerned. In this case also, there is no need of providing additional means for producing necessary information. This contributes to cost reduction of the monitoring apparatus.

Embodiment 3

In place of the speed information, the information taken from a car navigation system 25 which is mounted in the vehicle can be used for the purpose of image selection. An explanation will be given of an environment monitoring apparatus for a vehicle equipped with a danger deciding apparatus using the car navigation system.

As shown in FIG. 2, the car navigation system 25 includes a GPS receiver 25b (information acquisition means) for receiving the present position information representative of the present position of the vehicle on an earth through a GPS antenna 25a, a map data base 25c in which the map information having road information containing a road structure is stored, and μ COM A 22 for computing the passage of the vehicle concerned to a destination. The μ COM A22 receives the present position information from the GPS receiver 25b, map information from the map data base 25c and the passage information from the μ COM B 25d.

Figure 7:
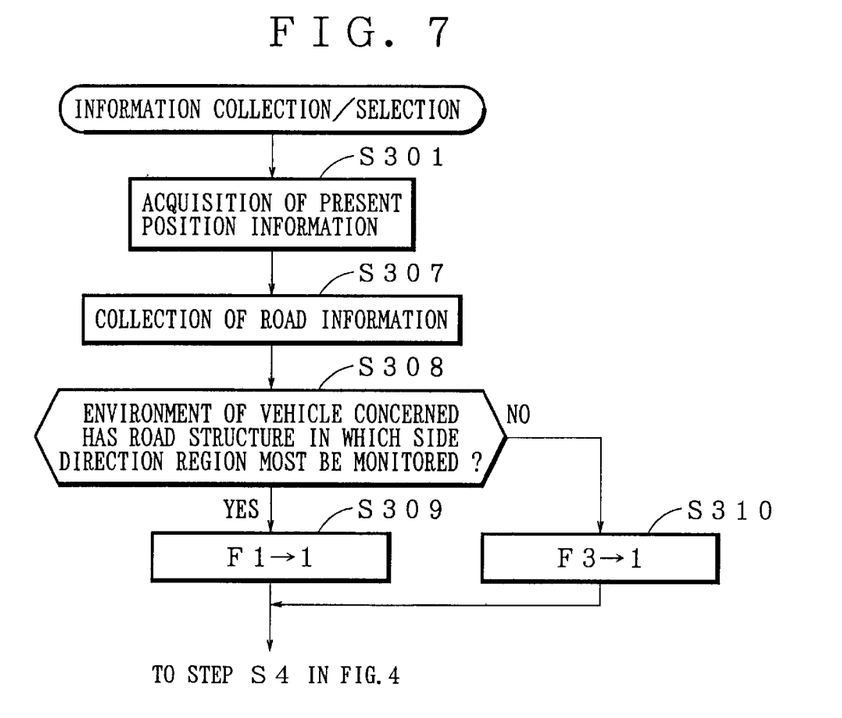
FIG. 7 is a flowchart for explaining collection/selection of information according to the third embodiment.

The environment monitoring apparatus according to the third embodiment operates in the same manner as the first embodiment except the processing of information collection/selection. Now referring to the flowchart of FIG. 7 showing the information collection/selection by the CPU 22a, an explanation will be given of the operation of the third embodiment.

First, the CPU 22a acquires the present position information from the GPS receiver 25a (step S306), and reads, from the map data base 25c, the environmental road information of the vehicle concerned corresponding to the present position information thus acquired (step S307). In step S307, the CPU 22a operates as a reading means.

On the basis of the road information thus acquired and the passage information from the μ COM B 25d, in step S308, it is decided whether or not the environment of the vehicle concerned has a road structure for which the side direction region must be monitored (e.g. there is an intersection difficult to see or a temporarily stopping line ahead of the vehicle concerned, the width of the road on which the vehicle concerned is running is narrow, the present position is an exit from a car park or a facility to a road). If YES, in order to select the left/right-side direction images, the left-side flag F1 is first set at 1 so that the left-side direction image is selected (step S309).

If NO in step S308, it is decided that the rear-side direction must be monitored. In this case, the rear-side direction image flag F3 is set at 1 to select the rear-side direction image (step S310).

As described above, since the environment road information of the vehicle concerned acquired from the map data base 25c is collected as information which changes according to the road structure, the map data base 25c and GPS receiver 25b of the car navigation apparatus can be used to acquire the information. Therefore, there is no need of providing means for producing the information corresponding to the road structure. This simplifies the structure of the environment monitoring apparatus and further reduces the production cost thereof. Further, since the road information including the road structure is acquired, it is possible to decide accurately the danger of contact with an approaching object.

Where the μ COM B 25d reads the road information of the present position from the map data base 25c and produces the read information thus read, as in the third embodiment, the CPU 22a does not read the road information, but the μ COM B 25d has only to acquire the road information.

In the first to the third embodiments, the CPU 22a could operate as the means for detecting the approaching degree by way of detection of the optical flow. However, the CPU 22a can operate as the means for detecting the approaching degree by way of detection of the distance from the object using two cameras apart from each other by a prescribed distance in a stereoscopic system.

What is claimed is:

1. A danger deciding apparatus for a vehicle comprising:
   information collecting means for acquring information which changes according to a road structure around a vehicle concerned;
   selecting means for selecting an image of the region which must be monitored from a plurality of images on the basis of the collected information when they are received, the plurality of images being obtained by picking up different monitoring regions;
   detecting means for processing the selected image to detect the approaching degree of an approaching object; and
   deciding means for deciding danger of contact with the approaching object on basis of the approaching degree.

2. A danger deciding apparatus for a vehicle according to claim 1, wherein the plurality of images include a rear-side direction image obtained when a rear region is picked up and left/right-side direction images obtained when left/right-direction regions are obtained.

3. A danger deciding apparatus for a vehicle according to claim 1, further comprising a speed sensor for detecting a speed of a vehicle concerned, wherein the information collecting means collects the speed as the above information.

4. A danger deciding apparatus for a vehicle according to claim 1, wherein the plurality of images includes an image which is received only when the road structure around the vehicle concerned becomes a prescribed structure, and the information collecting means collects the received image as the information.

5. A danger deciding apparatus for a vehicle according to claim 1, further comprising:
   map storage means for storing map information having road information including the road structure;
   information acquiring means for acquiring information indicative of the present position of the vehicle concerned; and
   reading means for reading the road information around the present position of the vehicle concerned from the map storage means on the basis of the information acquired by the information acquiring means, wherein the information collecting means collects the road information read by the reading means as the information.

6. A danger deciding apparatus for a vehicle according to claim 1, wherein the selecting means always selects the images of the regions which must be monitored simultaneously or a single image when they or it is received.

7. An environment monitoring apparatus for a vehicle comprising:
   information collecting means for acquring information which changes according to a road structure around a vehicle concerned;
   pick-up means for picking up different monitoring regions to acquire a plurality of images;
   selecting means for selecting an image of the region which must be monitored from a plurality of images on the basis of the collected information when they are received,
   detecting means for processing the selected image to detect the approaching degree of an approaching object; and
   deciding means for deciding danger of contact with the approaching object on basis of the approaching degree.

* * * * *